Oct. 21, 1958 W. E. McCOWN 2,857,537
ELECTRIC MOTOR DEVICE
Filed March 25, 1955 2 Sheets-Sheet 1

WITNESSES
*[signatures]*

INVENTOR
William E. McCown
BY
*[signature]*
ATTORNEY

United States Patent Office 2,857,537
Patented Oct. 21, 1958

2,857,537

ELECTRIC MOTOR DEVICE

William E. McCown, Mount Lebanon Township, Allegheny County, Pa., assignor to Westinghouse Electric Corporation, East Pittsburgh, Pa., a corporation of Pennsylvania Application March 25, 1955, Serial No. 496,832

16 Claims. (Cl. 310—83)

My invention pertains to electric motors, and more particularly to electric motors designed to operate in linear positioning devices.

In many industrial applications, it is often necessary to position certain elements in a linear direction inside of sealed pressure vessels. A linear motion device employing a lead screw driven by an expanding nut is disclosed in a patent application entitled Linear Positioning Device by W. G. Roman and R. C. Robinson, Serial No. 496,688, filed March 25, 1955 now Patent No. 2,780,740 and assigned to the same assignee as my invention. The application of Roman and Robinson discloses a linear motion device adapted to operate with the rotor of the drive motor submerged in the fluid of the system wherein the element which it is desired to position is located. The stator windings of the drive motor are enclosed in a separate compartment, which is formed by a thin-walled tubular member passing through the air gap of the drive motor and sealed to the motor frame at each end. In order to withstand the pressure of the fluid in the system without buckling, suitable backup members had to be employed at each end of the thin-walled tubular member where it was unsupported by the stator laminations.

While a motor design employing a thin-walled tubular member to isolate the stator windings is satisfactory, I have discovered that a relatively heavy-walled tubular member may be used for isolating the stator windings without appreciably affecting the characteristics of the motor, if a suitable material is chosen for the tubular member. A heavy-walled tubular member has many advantages over a design using a thin-walled tubular member with backup members. The heavy-walled member will require no backup members, thus using fewer parts while increasing the reliability of the device. It also will require no hermetic seals as are required at each end of the thin-walled tubular member. The hermetic sealing of each end of the thin-walled tubular member to the relatively heavy walls of the motor frame involves considerable difficulty due to the difference in thickness and material of the two members being sealed. In addition, the stator of a motor employing a thin-walled tubular member must be completely enclosed in a fluid-tight outer frame since the thin-walled tubular member may rupture, thus flooding the stator with the system fluid. The enclosing of the stator in a fluid-tight outer frame in addition greatly increases the problem of cooling the stator. By employing my design of a heavy-walled tubular member, the stator may be mounted on the outer surface of my tubular member which may itself comprise part of the motor frame and be left completely exposed to the surrounding atmosphere. Thus, it will require no special cooling arrangements, although they may be used if desired.

Accordingly, the principal object of my invention is to provide an electric motor operated linear positioning device with a novel construction wherein a heavy-walled tubular member forms both the partition for isolating the rotor compartment of the motor, and the frame for mounting the stator of the motor.

Another object of my invention is to provide an electric motor operated linear positioning device having a relatively heavy-walled motor frame with a unique stator assembly which can be installed and removed from the outer surface of the motor frame without disturbing the rotor or motor frame.

Another object of my invention is to provide an electric motor operated linear positioning device with a novel rotor construction for the motor having a plurality of arms rotatable therewith which are pivotally mounted on one rotatably mounted tubular member and retained by a second rotatably mounted tubular member for limited movement into and out of driving engagement with a linearly movable member.

Another object of my invention is to provide an electric motor operated linear positioning device with a novel rotor construction for the motor having a plurality of arms which are pivoted on one member and limited in movement by a second member axially spaced from said first member.

Another object of my invention is to provide a novel electric motor designed to operate on low frequency polyphase current with its rotor submerged in fluid from an external source and having a relatively heavy-walled tubular member which forms both the motor frame and the partition for isolating the rotor compartment.

Another object of my invention is to provide an electric motor designed to operate on low frequency polyphase current with its rotor submerged in a fluid from an external source, with a unique tubular member which serves as a means for isolating the stator and as a motor frame thus eliminating the need for seals between the isolating member and the heavy end structure of the motor frame.

These and other objects and advantages of my invention can more readily be understood from the following detailed description with reference to the attached drawings, in which.

Figure 1:
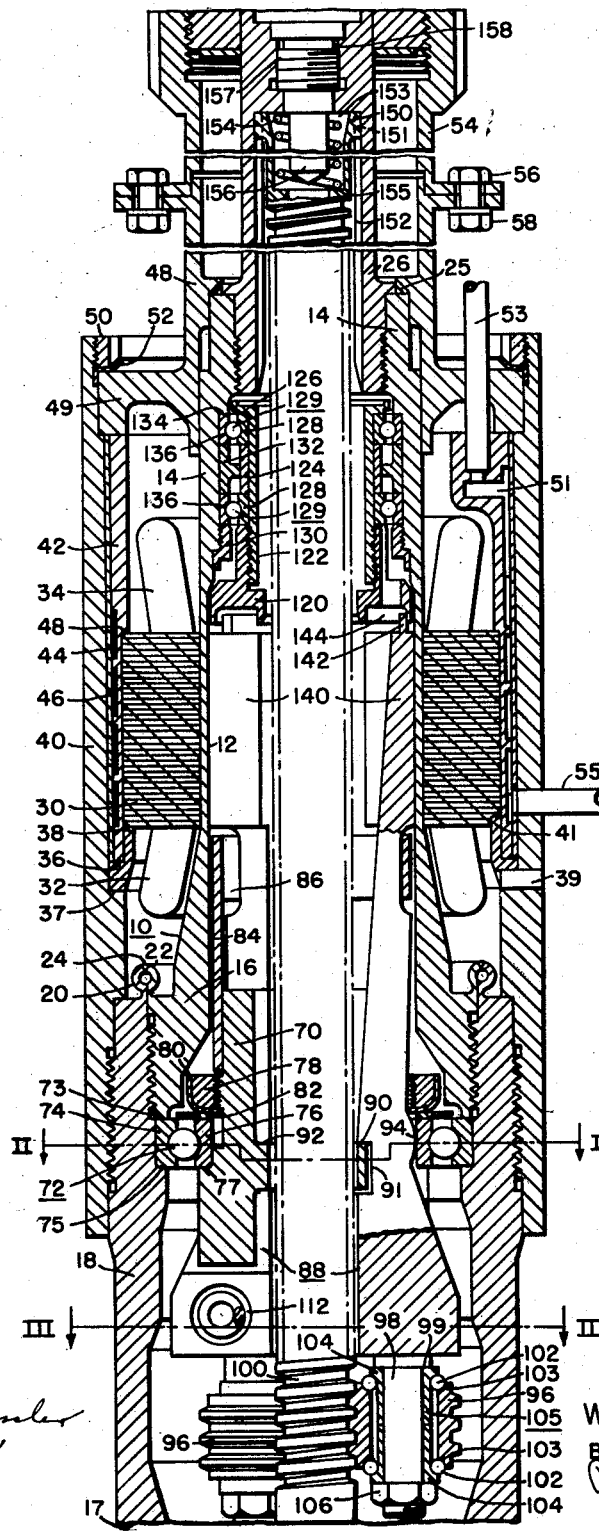
Figure 1 is a substantially central longitudinal section of a linear positioning device embodying my invention taken along line I—I of Fig. 2.

Referring now particularly to Fig. 1, there is shown an electric motor operated linear positioning device having a tubular member 10 which serves both to isolate the motor stator from the fluid contained in the rotor compartment, and as the motor frame for the motor used in driving the lead screw 100. The tubular member 10 has a center section 12 of uniform wall thickness and uniform diameter, and the stator assembly is positioned on the outer surface of this uniform center section. The upper end 14 of the tubular member 10 has an increased wall thickness in order that an upper extension 26 preferably of a corrosion resistant material, such as stainless steel, may be threadedly attached to the upper end of the tubular member 10. While the upper end 14 of the tubular member 10 has an increased wall thickness, the outer surface of the tubular member 10 is retained the same diameter as center section 12, and the increased thickness is obtained by decreasing the inner diameter. The lower portion 16 of the tubular member 10 likewise has a thicker wall section so that a lower tubular extension 18, also preferably of a corrosion resistant material such as stainless steel, may be threadedly attached to it. The increased wall thickness of the lower portion 16 is obtained by increasing the outer diameter of the tubular member 10 while retaining the same inner diameter as center section 12. I prefer to fabricate the tubular member 10 so that it has a uniform outer diameter at the top and a uniform inner diameter at the bottom in order to facilitate the assembly of my linear positioning device as will be described later.

If the positioning device is to be operated in a system where leakage is not desired, the threaded joint between the lower extension 18 and the tubular member 10 may be sealed by a small weld 24 which joins integral arcuate shaped annular lips on these two members. Likewise, the threaded joint between the upper extension 26 and tubular member 10 may be sealed by a small annular weld 25. The lower end 17 of the lower extension 18 may be sealed directly to the shell of a pressure vessel (not shown), and the fluid contained in the pressure vessel may then fill the central opening in the tubular member 10, and the upper and lower extensions 14 and 18.

My positioning device is designed to operate with the rotor submerged in the fluid of a pressure system in which the element to be positioned is located, thus the tubular member 10 with its upper and lower extensions may actually form a part of the pressure vessel of the system and in that case must be designed to withstand full system pressure. In many systems this pressure may be on the order of two or three thousand pounds per square inch.

Previously it had been considered essential to maintain the motor air gap as small as possible to obtain efficient motor operation, and hence thin tubes previously had been used in order to have as little effect as possible on the electrical properties of the air gap. Thus one would expect that if a tubular member of appreciable thickness were used of a magnetic material, the motor would produce little or no torque since the magnetic flux would be short-circuited circumferentially from stator pole to pole by such a tubular member. On the other hand, if the tubes were of non-magnetic material, the relatively long air gap occupied by the relatively heavy wall of the tubular member would require an excessively high excitation, and $I^2R$ losses of the stator would be too great to be removed by any suitable cooling means.

However, I have discovered that if the tubular member is formed of a material having a controlled permeability, it will effectively reduce the apparent air gap and at the same time short-circuit only a relatively small amount of the flux. Thus, the efficiency of the motor will not be appreciably reduced. One material which I have found that fulfills these requirements is a stainless steel consisting of about 11.5 to 13.5 percent of chromium, .15 carbon and the balance of iron. If such a material is hardened by conventional heating and quenching to maximum hardness, and then tempered at 500° F. for approximately two hours after which it is air cooled, it will not affect the characteristics of the motor to any great degree, even when used in the thicknesses required to stand extremely high pressures. This material also has great structural strength having a maximum tensile strength of approximately 200,000 pounds per square inch, thus requiring a minimum thickness for the tubular member 10 even in cases of extremely high pressures. The above material, when heat treated as described, will have a magnetic flux density curve as shown by curve A in Fig. 4. The flux density curves for silicon steel and air are also shown for the purpose of comparison.

Figure 4:
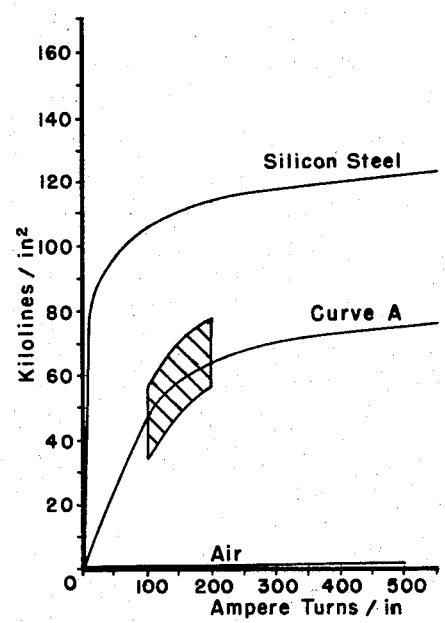
Fig. 4 is a graph showing the relationship between the magnetic flux density of the material used in my invention, silicon steel and air.

The magnetic properties of the material used in fabricating the tubular member 10 could also be expressed in terms of magnetic permeability, which is the ratio of the flux density of the material to the flux density of air when both are energized by the same number of ampere turns per inch. As shown in Fig. 4 at 100 ampere turns per inch, the preferred material for tubular member 10 will have a flux density of about 45,000 lines per square inch, while air will have a flux density of about 320 lines per square inch; thus, the material has permeability of about 140. Silicon steel at 100 ampere turns per inch has a permeability of approximately 330. This means that the material I prefer to use for tubular member 10 has approximately one-half the magnetic permeability of silicon steel when both are energized by the same number of ampere turns per inch. After investigating numerous materials, I have found that those having a flux density curve which falls in the range between about 35 and 55 kilolines at 100 ampere turns per inch and between about 55 and 75 kilolines at 200 ampere turns will serve satisfactorily for tubular member 10. This range of values is illustrated by the cross sectioned area on Fig. 4. Of course, materials having the desired magnetic properties must also have sufficient mechanical strength to withstand the system pressure in addition to the proper magnetic properties.

Using the material described above, I have constructed a reluctance type motor designed to operate at a speed of 0 to 50 revolutions per minute in either direction and to deliver 8 foot-pounds of torque, while the rotor is submerged in a high temperature fluid at 2000 pounds per square inch. The most logical way to obtain the required variation in speed was to use a polyphase current which had a frequency of from zero to approximately two cycles per second to energize the stator windings. Using a four pole motor, this range of frequencies will allow the motor speed to be varied from zero to sixty revolutions per minute and if provision is made for reversing the phase rotation of the power supply, the motor can be run in either direction over the above speed range. The tubular member 10 for this motor had a 4 inch uniform inner diameter from its lower end through the center section 12 and a ⅛ inch wall thickness for the center section 12. This tubular member met the intent of all the requirements of the American Society of Mechanical Engineers Boiler Code for a pressure vessel adapted to contain fluid at a pressure in the neighborhood of 2000 pounds per square inch. The motor using this tubular member has good electrical efficiency because the hysteresis and eddy current losses which are a function of the current frequency are low due to the low frequency current used. Even so, this motor may be operated at frequencies up to at least sixty cycles per second or 1800 revolutions per minute if sufficient cooling for the stator is provided. While it has also been proposed to use materials having some slight magnetic permeability, all of these materials were, in fact, relatively non-magnetic and had insufficient mechanical strength to withstand substantial pressures. Actually the flux density curves of these materials are only slightly higher than air and considerably below the flux density curve A of Fig. 4, and would not be satisfactory for the same purposes as this invention. My invention allows the building of motors using a tubular member 10 of sufficient strength to be self supporting without impairing the efficiency of the motor. While my invention may be used on any electric motor where it is desired to isolate the rotor compartment from the stator, it is especially useful in polyphase motors designed to operate on low frequency alternating current.

The stator assembly is comprised of a stack of stator laminations 30 preferably of a magnetic material, such as silicon steel, having inwardly opening slots (not shown) which contain a suitable stator winding having upper and lower end turns 34 and 32, respectively. The stacked stator laminations are supported at their lower end by the upper edge 38 of a ring member 36 which rests on a shoulder 37 formed on the inner surface of the outer tubular frame 40. The ring member 36 may be prevented from rotating by means of a pin 39 which projects through the outer tubular frame 40 into an opening in the ring member 36. The ring member 36, in turn, prevents rotation of the stator assembly by means of a small projection 41 that extends upward into an opening in the stacked stator laminations 30. The outer tubular frame 40 at its lower end threads onto the outer surface at the upper end of the lower extension 18. The stator assembly is locked in the axial position shown by a tubular sleeve 42 which extends downward over the outer surface of the stacked stator laminations 30 and has an inwardly projecting shoulder 48 near its center which engages the upper surface of the stacked stator laminations. The tubular sleeve 42 is held in position by a downwardly projecting flange 49 formed on the lower end of an upper outer tubular extension 48. The outer extension 48 is held in position by a retaining ring 50 which threads into the outer frame 40 and serves to lock the complete stator assembly in position. A suitable washer 52 may be used between ring 50 and flange 49, and may be of a locking type to ensure the tightness of the retaining ring 50.

Formed on the outer surface of the tubular sleeve 42, used in positioning the stator assembly, is a shallow spiral groove 44. The spiral groove is closed on its outer surface by a second tubular sleeve 46 which is positioned between the outer frame 40 and the tubular sleeve 42 so as to form a closed spiral path around the outer surface of the stator assembly. A suitable cooling fluid may be introduced through an inlet conduit 53 which extends downward through the flange at the lower end of the outer extension 48 and connects with the spiral groove 44 by means of connecting conduit portion 51 of tubular member 42 to cool the stator assembly. The cooling fluid would then flow around the stator assembly in the spiral groove 44 and finally flow out of the spiral groove 44 at the lower end of the stator assembly through a suitable outlet conduit 55 which passes through the outer tubular frame 40 and connects with the lower end spiral groove 44 by means of a suitable hole in member 46. Attached to the upper outer extension 48 is a second upper outer extension 54 which forms the top portion of my linear positioning device. The two outer extensions 48 and 54 may be secured together by any desired means, such as bolts and nuts 56 and 58, respectively, which pass through openings in outwardly extending flanges formed on the adjacent ends of the two extensions.

The above construction allows the stator assembly to be installed on and removed from the outer surface of the tubular member 10 without disturbing any of the mechanism mounted on the inner surface of the tubular member 10. In order to remove the stator assembly all that is necessary is to remove the retaining ring 50 which will allow removal of the upper outer tubular extensions 48 and 54 as a unit. The stator assembly including the stacked laminations 30, the stator windings and tubular sleeves 42 and 46 can then be removed from the outer surface of the tubular member 10. This ability to remove the stator assembly without disturbing the mechanism mounted on the inner surface of tubular member 10 is very important where the positioning device is sealed by welds 24 and 25, since removal of the mechanisms mounted on the inner surface would require breaking of the welds 24 and 25. To replace the stator assembly, all that is necessary is to slide the stator assembly into position on the outer surface of tubular member 10 from the top and reassemble the upper outer tubular extensions 48 and 54.

Figure 2:
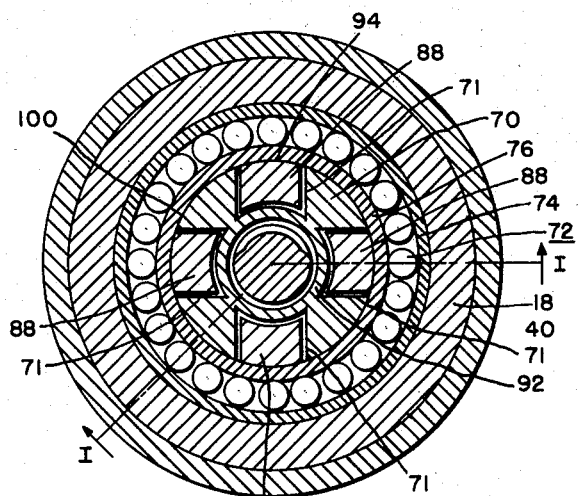
Fig. 2 is a transverse section of the linear positioning device shown in Fig. 1 taken along line II—II of Fig. 1, showing the mounting of the pivoted rotor arms.
Figure 3:
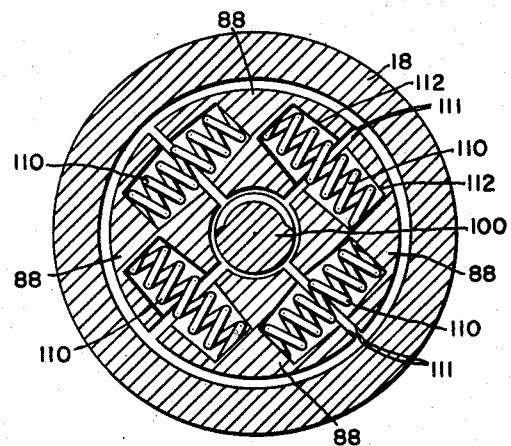
Fig. 3 is a transverse section of the linear positioning device shown in Fig. 1 taken along line III—III of Fig. 1, showing the spring-biasing arrangement used for disengaging the expanding nut from the lead screw.

The rotor of my linear positioning device includes, in this example, four longitudinally extending rotor arms 88 which are supported by rotatably mounted upper and lower rotor tubes. The lower rotor tube 70 is rotatably mounted in the tubular frame member 10 by means of a ball bearing 72, the outer race 74 of which is locked between an inwardly projecting shoulder 75 formed on the upper portion of the lower tubular extension 18 and the lower edge 73 of the tubular member 10. The inner race 76 of the ball bearing 72 is locked against an outwardly projecting shoulder 77 formed on the outer surface of the lower rotor tube 70 by means of a nut 78 which engages suitable threads formed on the outer surface of the upper end of tube 70. A washer 80 may be interposed between nut 78 and inner race 76 and may be of the locking type. Placed between the washer 80 and the inner race 76 is a shielding ring 82 for preventing entry of foreign matter into the ball bearing 72 from the top. Pivotally mounted on the lower rotor tube 70 are the four rotor arms 88, formed preferably of a corrosion resistant magnetic material, such as a magnetic stainless steel. Each of the rotor arms 88 has a generally arcuate cross section at their upper end 140 which merges with a reduced substantially square section for the central portion of the arms as shown in Fig. 2. The lower end of each arm is increased in size and has a generally sector shaped section (Fig. 3), so that when the four rotor arms 88 are placed in position they form substantially a complete ring at the bottom as shown in Fig. 3, and at the top as well. The pivoted rotor arms 88 are received in longitudinal slots 71 formed in tubular member 70 and each have a spheroidal surface 94 formed on the outer sides thereof which rest on the inner surface of the inner race 76 of the ball bearing 72. Each rotor arm 88 pivots about a pivot point 90 located on the upper end of a notch 91 cut in the inner surface of each of the rotor arms 88. The notch 91 receives a flange 92 which projects inwardly from the inner surface of the rotor tube 70. Outward movement of the upper ends of the rotor arms 88 is restricted by means of a ring member 86 which is supported above the lower rotor tube 70 by means of a plurality of circumferentially spaced arms 84 which may be integral with ring member 86. The lower ends of arms 84 may be attached to the rotor tube 70 by any suitable means, such as cap screws (not shown).

Mounted on the lower end of each of the rotor arms 88 is a roller nut 96 for driving the lead screw 100. The roller nut 96 is rotatably mounted on a pin-like extension 98 of the rotor arm 88, by means of suitable balls 102 which run between inner races 105 and outer races 103. Each outer race 103 for the balls 102 is formed at each inner corner of the roller nut 96, while each inner race consists of two flanged sleeves 104 oppositely mounted on extension 98. The complete roller nut assembly is retained on each pin 98 against a shoulder 99 by means of a nut 106.

The lower ends of the rotor arms 88 are spring biased outwardly so that the roller nuts 96 will be biased out of engagement with the lead screw 100. This spring-biasing arrangement is shown in Fig. 3 and consists of four compression springs 110 each of which is located in two opposed adjacent holes 112 and reacts against the bottoms of these holes to spread the rotor arms 88 apart. The holes 112 are drilled perpendicular to the longitudinal side surfaces 111 of each rotor arm 88 and are located so that the holes in adjacent arms will be opposite each other.

The upper rotor tube for the rotor arms 88 consists of an upper bearing support ring 120 which is threaded onto the lower end of an upper bearing support tube 122. The upper bearing support ring 120 also serves to lock the inner races 128 of the ball bearings 129 used for rotatably mounting the upper rotor tube, as will be described. The outer races 136 of the ball bearings are locked in position at the top against an inwardly projecting shoulder 134 formed on the inner surface of the tubular member 10 by means of an annular lock nut 130 which engages threads formed on the inner surface of tubular member 10 at the bottom of the outer races. Suitable inner and outer spacers 124 and 132, respectively, are used to properly space the ball bearings in an axial position. The upper end of each of the rotor arms 88 has a relatively thin narrow projecting tongue 142 which may move radially in an elongated slot 144 formed on the lower surface of the upper bearing support ring 120. By means of this arrangement, the rotor arms are guided radially as they pivot about their pivot point 90 on the lower rotor tube 70.

In assembling the rotor of my linear positioning device all the parts are inserted from the bottom of tubular member 10. First the upper rotor tube assembly including the bearings 128 and outer lock ring 130 is installed in the tubular member 10. The upper rotor tube assembly may be installed by first locking the outer races of bearings 128 in place with the upper bearing support tube 122 suspended on the inner races. Lower support tube 120 can then be threaded onto upper support tube 122 to complete the assembly of the upper rotor tube. Then the lower rotor tube and rotor arms can be placed in position and held in place while the tubular member 10 and lower extension 18 are threaded together. When the tubular member 10 and lower extension 18 are threaded together, they will lock the outer race 74 of the bearing 72 in place, thus retaining the complete rotor assembly. To remove the rotor assembly the opposite procedure would be followed.

It can thus be seen that when the stator windings are energized the upper portions 140 of the rotor arms 88 will move radially outward due to the magnetic flux of the stator field. As the upper portions 140 move radially outward, the lower ends of the rotor arms 88 will move radially inward, thus engaging the roller nuts 96 with lead screw 100. When the rotor arms reach the limit of their outward travel, they will be supported by the upper rotor tube, the ring member 86, and lower rotor tube, thus forming a rigid structure which will rotate as a unit. As the rotor assembly rotates, the roller nuts will drive the lead screw in an axial direction. The direction of movement of the lead screw will, of course, depend upon the direction of rotation of the rotor assembly. When the stator assembly is deenergized, the upper portion of the rotor arms will no longer be attracted by the magnetic flux of the stator assembly, and thus the springs 110 at the lower ends of the rotor arms will move the roller nuts 96 out of engagement with the lead screw 100. When the roller nuts 96 are out of engagement, the lead screw 100 in one arrangement is driven in a downward direction by a compression spring 154 contained in the upper portion of my linear positioning device. Thus, my linear positioning device will move the lead screw to its extreme downward position when the current supplied to the stator windings is interrupted, as the lead screw will then be released and driven in a downward direction by the compressed spring 154. Of course, the downward position of the lead screw 100 could be designed as a safe position for the element being controlled by the linear positioning device, so that upon a power failure it will fail-safe.

The upper portion of the lead screw 100 has an outwardly extending flange 150 formed thereon, which has a plurality of circumferentially spaced longitudinal slots 151 generated on its outer surface which cooperate with inwardly projecting splines 152 formed on the inner surface of the upper tubular extension 26. In this application, the tubular extension and the splines are substantially coextensive with the length of lead screw travel, and this spline arrangement serves to prevent the rotation of the lead screw as the roller nuts 96 rotate to drive it in an axial direction. The center of the lead screw 100 is bored out at the upper end so as to receive the compression spring 154. The lower end of the compression spring 154 acts against an inwardly projecting shoulder 155 formed in the bored-out portion of the lead screw and acts on an inwardly projecting shoulder 153 at the top of the upper extension 26. A pilot pin 156 which is threaded into a central opening 157 in the upper end of extension 26 extends centrally downwardly into compression spring 154 and serves to guide the spring. If it is desired to completely seal the rotor compartment, the pilot pin may be sealed to the upper extension 26 by means of a small weld 158.

While I have shown but one embodiment of my invention, it is, of course, easily adapted to many different forms. The embodiment shown in Fig. 1 is a linear positioning device, but my heavy-walled tubular member would be just as suitable for any low frequency polyphase electric motor. Likewise, the arrangement shown in Fig. 1 for cooling the stator assembly could be omitted, and the stator assembly cooled by the natural circulation of air over it. This latter arrangement is especially advantageous when using my invention since the heavy-walled member which isolates the rotor compartment requires no backup members, and thus the stator can simply be positioned on its outer surface and air cooled. Such an arrangement is impossible where thin-walled tubular members are used in isolating the rotor compartment since they may rupture in service, thus flooding the stator compartment with the fluid contained in the rotor compartment. It is thus necessary in such an arrangement to enclose the stator assembly in a separately sealed outer container which has sufficient strength to withstand the pressure of the fluid.

Thus, it is desired that my invention be not limited to the specific construction shown and described herein for illustrative purposes, because it will be apparent to those skilled in this art that my invention may be embodied in a number of different forms.

I claim as my invention:

1. A linear position device comprising, a generally tubular motor frame of material having a magnetic flux of between 35 and 55 kilolines per square inch when energized by 100 ampere turns per inch and between 55 and 75 kilolines per square inch when energized by 200 ampere turns per inch, a stator assembly mounted on said motor frame, a lead screw having drive means therefor, a rotor comprising two tubular members rotatably mounted in said tubular motor frame in axially spaced apart relation, and a plurality of arms pivotally mounted at a point between their ends on one of said tubular members so that the ends of said arms may move in a radial direction, said drive means being mounted on one end of said arms, the other end of said arms being limited in movement by the other of said tubular members and a biasing arrangement adjacent said drive means to disengage said drive means from said lead screw.

2. A linear position device comprising, a generally tubular motor frame of material having a magnetic flux of between 35 and 55 kilolines per square inch when energized by 100 ampere turns per inch and between 55 and 75 kilolines per square inch when energized by 200 ampere turns per inch, said motor frame having a center portion of uniform wall thickness, a stator assembly having a polyphase winding positioned on the outer surface of said center portion, a rotor rotatably mounted within said tubular member, said rotor comprising two tubular members rotatably mounted at opposite ends of said tubular frame, a plurality of arms of magnetic material pivotally mounted at a point between their ends on one of said tubular members, one end of said pivoted arms extending under said stator field and limited in radial movement by the other of said tubular members, a lead screw adapted to pass through said rotor, a drive means for said lead screw, said drive means being mounted on the other end of said pivoted arms, and biasing means to disengage said drive means from said lead screw.

3. A linear position device comprising, a generally tubular motor frame, a stator assembly mounted on said motor frame, a lead screw having drive means therefor, a rotor comprising two tubular members rotatably mounted in said tubular motor frame in axially spaced apart relation, and a plurality of arms pivotally mounted at a point between their ends on one of said tubular members so that the ends of said arms may move in a radial direction, said drive means being mounted on one end of said arms, the other end of said arms being limited in movement by the other of said tubular members and a biasing arrangement adjacent said drive means to disengage said drive means from said lead screw.

4. A linear position device comprising, a generally tubular motor frame of material having a magnetic permeability equal to about one half the magnetic permeability of silicon steel when both are energized by the same number of ampere turns per inch, a stator assembly mounted on said motor frame, a lead screw having drive means therefor, a rotor comprising two tubular members rotatably mounted in said tubular motor frame in axially spaced apart relation, and a plurality of arms pivotally mounted at a point between their ends on one of said tubular members so that the ends of said arms may move in a radial direction, said drive means being mounted on one end of said arms, the other end of said arms being limited in movement by the other of said tubular members and a biasing arrangement adjacent said drive means to disengage said drive means from said lead screw.

5. A linear drive mechanism comprising, a motor having a tubular stator assembly including a magnetic core, a rotor assembly within said stator assembly, said rotor assembly including a tubular support located outwardly of one end of the stator core and mounted for rotation substantially on the axis of said stator assembly, a plurality of circumferentially spaced arms pivotally mounted on said support for movement at a angle to the axis of said stator assembly, each of said arms having at least a portion of magnetic material extending into the stator assembly to be located opposite the stator core so that said portions of the arms will be pivotally moved in one direction when the stator assembly is energized, means biasing said arms for movement in the opposite direction, a lead screw, and means on outwardly spaced portions of said arms for drivingly engaging said lead screw in response to pivoted movement of the arms in one direction.

6. A linear drive mechanism comprising, a motor having a tubular stator assembly including a magnetic core, a rotor assembly within said stator assembly, said rotor assembly including a tubular support located adjacent one end of the stator core and mounted for rotation substantially on the axis of said stator assembly, a plurality of circumferentially spaced arms pivotally mounted on said support for movement at an angle to the axis of said stator assembly, each of said arms having at least a portion of magnetic material extending into the stator asembly to be located opposite the stator core so that said portions of the arms will be pivotally moved in one direction when the stator assembly is energized, means biasing said arms for movement in the opposite direction, a tubular member located adjacent the other end of said stator assembly and having means for limiting outward movement of the adjacent ends of said arms, a lead screw, and means on outwardly spaced portions of said arms for drivingly engaging said lead screw in response to pivoted movement of the arms in one direction.

7. A linear drive mechanism comprising, a motor having a tubular stator assembly including a magnetic core, a rotor assembly within said stator assembly, said rotor assembly including a tubular support located adjacent one end of the stator core and mounted for rotation substantially on the axis of said stator assembly, a plurality of circumferentially spaced arms pivotally mounted on said support for movement at an angle to the axis of said stator assembly, each of said arms having at least a portion of magnetic material extending into the stator assembly to be located opposite the stator core so that said portions of the arms will be pivotally moved in one direction when the stator assembly is energized, means biasing said arms for movement in the opposite direction, a tubular member located adjacent the other end of said stator assembly and mounted for rotation substantially on the axis of said stator assembly, said tubular member having guide means engaged by the adjacent ends of said arms for guiding such ends of the arms during pivotal movement of the arms, a lead screw, and means on outwardly spaced portions of said arms for drivingly engaging said lead screw in response to pivoted movement of the arms in one direction.

8. A linear drive mechanism comprising, a motor having a tubular stator assembly including a magnetic core, a rotor assembly within said stator assembly, said rotor assembly including a tubular support located adjacent one end of the stator core and mounted for rotation substantially on the axis of said stator assembly, a plurality of circumferentially spaced arms pivotally mounted on said support for movement at an angle to the axis of said stator assembly, each of said arms having at least a portion of magnetic material extending into the stator assembly to be located opposite the stator core so that said portions of the arms will be pivotally moved in one direction when the stator assembly is energized, means biasing said arms for movement in the opposite direction, a tubular member located adjacent the other end of said stator assembly and mounted for rotation substantially on the axis of said stator assembly, said tubular member having guide means engaged by the adjacent ends of said arms for guiding such ends of the arms during pivotal movement of the arms and for limiting outward movement of the adjacent ends of the arms, a lead screw, and means on outwardly spaced portions of said arms for drivingly engaging said lead screw in response to pivoted movement of the arms in one direction.

9. A dynamoelectric machine comprising a pressurized tubular frame; an armature assembly mounted for movement within said frame; a stator assembly mounted on said frame at a position juxtaposed to that of said armature assembly, said frame being of such thickness that if said frame were formed from a good magnetic material such as silicon steel it would short-circuit enough magnetic flux of the stator as to reduce substantially the operating torque developed by the machine; but said frame being formed from an alloy having a permeability substantially half that of silicon steel.

10. A dynamoelectric machine comprising a pressurized tubular frame; an armature assembly mounted for movement within said frame; a stator assembly mounted on said frame at a position juxtaposed to that of said armature, said frame being of such thickness that if said frame were formed from a good magnetic material such as silicon steel it would short-circuit enough magnetic flux of the stator as to reduce substantially the operating torque developed by the machine; but said frame being formed from an alloy having a permeability in the neighborhood of 140 when the stator is energized with about 100 ampere-turns per inch.

11. A dynamoelectric machine comprising a pressurized tubular frame; an armature assembly mounted for movement within said frame; a stator assembly mounted on the outer periphery of said frame at a position juxtaposed to that of said armature assembly, said frame being of such thickness that if said frame were formed from a good magnetic material such as silicon steel it would short-circuit enough magnetic flux of the stator as to reduce substantially the operating torque developed by the machine; but said frame being formed from an alloy having a magnetic flux density of between 35 and 55 kilolines per square inch when the stator is energized with about 100 ampere-turns per inch and between 55 and 75 kilolines per square inch when the stator is energized with about 200 ampere-turns per inch.

12. A dynamoelectric machine comprising a pressurized tubular frame; an armature assembly mounted for movement within said frame; a stator assembly mounted on the outer periphery of said frame at a position juxtaposed to that of said armature assembly, said frame being of a thickness sufficient to withstand an operating pressure in the neighborhood of 2,000 pounds per square inch, and said frame being formed from an alloy having a permeability substantially half that of silicon steel.

13. A dynamoelectric machine comprising a pressurized tubular frame; an armature assembly mounted for movement within said frame; a tubular stator assembly mounted on the outer periphery of said frame at a position juxtaposed to that of said armature assembly, the portion of said frame within the stator being in the neighborhood of one-eighth inch in thickness, and said frame being formed from an alloy having a permeability substantially half that of silicon steel.

14. A dynamoelectric machine comprising a pressurized tubular frame; an armature assembly mounted for movement within said frame; a stator assembly mounted on the outer periphery of said frame at a position juxtaposed to that of said armature assembly, said frame being of such thickness that if said frame were formed from a good magnetic material such as silicon steel it would short-circuit enough magnetic flux of the stator as to reduce substantially the operating torque developed by the machine; but said frame being formed from a material having a permeability substantially half that of silicon steel, said material being a hardened alloy comprising chromium and low carbon steel.

15. A dynamoelectric machine comprising a pressurized tubular frame; an armature assembly mounted for movement within said frame; a stator assembly mounted on the outer periphery of said frame at a position juxtaposed to that of said armature assembly, said frame being of such thickness that if said frame were formed from a good magnetic material such as silicon steel it would short-circuit enough magnetic flux of the stator as to reduce substantially the operating torque developed by the machine; but said frame being formed from a material having a permeability susbtantially half that of silicon steel, said material being a hardened alloy comprising 11.5 to 13.5% chromium and a balance of low carbon steel.

16. A dynamoelectric machine comprising a pressurized tubular frame; an armature assembly mounted for movement within said frame; a stator assembly mounted on the outer periphery of said frame at a position juxtaposed to that of said armature assembly, said frame being of such thickness that if said frame were formed from a good magnetic material it would short-circuit enough magnetic flux of the stator as to reduce substantially the operating torque developed by the machine but said frame being formed from a material having a permeability substantially half that of silicon steel, said material being a hardened alloy comprising chromium and low carbon steel, and having been tempered at a temperature in the neighborhood of 500° F. for about two hours.

References Cited in the file of this patent

UNITED STATES PATENTS

| | | |
|---|---|---|
| 1,404,862 | Kirstatter | Jan. 31, 1922 |
| 1,722,284 | Fisher | July 30, 1929 |
| 2,258,064 | Myers | Oct. 7, 1941 |
| 2,322,924 | Daiger | June 29, 1943 |

FOREIGN PATENTS

| | | |
|---|---|---|
| 111,585 | Australia | Oct. 3, 1940 |
| 576,249 | Great Britain | Mar. 26, 1946 |
| 755,956 | Germany | Mar. 23, 1953 |